(12) United States Patent
Bainachi

(10) Patent No.: US 6,338,490 B1
(45) Date of Patent: Jan. 15, 2002

(54) SEALING ARRANGEMENT WITH AUTOMATIC CLEARANCE ADJUSTMENT

(75) Inventor: Daniel Olivier Bainachi, Avon (FR)

(73) Assignee: Societe Nationale d'etude et de Construction de Moteurs d'Aviation "Snecma", Paris (FR)

(*) Notice: Subject to any disclaimer, the term of this patent is extended or adjusted under 35 U.S.C. 154(b) by 0 days.

(21) Appl. No.: 09/363,838

(22) Filed: Jul. 30, 1999

(30) Foreign Application Priority Data

Aug. 5, 1998 (FR) .............................. 98 10041

(51) Int. Cl.⁷ ................................. F16J 15/32
(52) U.S. Cl. ...................... 277/400; 277/401; 277/544; 277/552
(58) Field of Search ................. 277/431, 544, 277/546, 547, 552, 400, 401

(56) References Cited

U.S. PATENT DOCUMENTS

| | | | |
|---|---|---|---|
| 1,331,360 A | * 2/1920 | Parsons et al. | 277/544 |
| 1,338,955 A | * 5/1920 | Parsons et al. | 277/544 |
| 3,600,048 A | 8/1971 | Makhobey | |
| 3,844,572 A | * 10/1974 | Parker | 277/544 |
| 3,874,677 A | 4/1975 | Ludwig et al. | |
| 4,082,296 A | * 4/1978 | Stein | 277/400 |
| 4,305,592 A | * 12/1981 | Peterson | 277/430 |
| 4,344,631 A | * 8/1982 | Winn | 277/552 |
| 4,706,966 A | * 11/1987 | Lind | 277/431 |
| 4,971,306 A | * 11/1990 | Jinnouchi et al. | 277/544 |
| 5,145,189 A | 9/1992 | Pope | |
| 5,516,118 A | * 5/1996 | Jones | 277/400 |
| 5,558,341 A | * 9/1996 | McNickle et al. | 277/400 |

FOREIGN PATENT DOCUMENTS

DE 373 406 4/1923

OTHER PUBLICATIONS

Patent Abstracts of Japan, vol. 011, No. 111 (M–578), Apr. 8, 1987, JP 61 256065, Nov. 13, 1986.

* cited by examiner

*Primary Examiner*—Anthony Knight
*Assistant Examiner*—Alison K. Pickard
(74) *Attorney, Agent, or Firm*—Oblon, Spivak, McClelland, Maier & Neustadt

(57) ABSTRACT

The seal is composed of butt-jointed segments (1) in which the bearing surface (18) on a rotating part (2) subject to wear, includes a hollow chamber (20) communicating through calibrated orifices (22) with a high pressure containment (8). Therefore, it fills up with gas which tends to force it away from the surface, thus reducing the contact pressure without introducing excessive leaks.

8 Claims, 2 Drawing Sheets

SEALING ARRANGEMENT WITH AUTOMATIC CLEARANCE ADJUSTMENT

BACKGROUND OF THE INVENTION

1. Field of the Invention

The invention relates to a sealing arrangement, particularly including a seal with automatic clearance adjustment.

2. Description of the Background

This seal forms part of the family of segmented seals composed of elements called segments that are butt-jointed and each extend over a portion of the circumference; these segments are connected together by a surrounding spring that tends to force them into contact with a part such as a shaft with which the seal is to be formed.

The problem that arises in this case is wear of the seal caused by friction due to the shaft rotating on the seal; since this wear is proportional to the shaft rotation speed and the pressure of the segments, it is desirable to minimize this pressure. One method would be to suitably choose the spring or to adjust its characteristics, particularly making sure that it is not too tight, but in reality this would not be very easy or even very useful since this force is very small compared with the radial pressure force exerted on the segments. Another solution is to use the rotation speed of the rotor to create a hydro-dynamic air pressure at the contact between segments and the rotor, subject to some arrangements on segments (Rayleigh pads). The major disadvantage of this technology is that it is inefficient at low and medium rotor speeds. Therefore, up to now there has been no efficient way of limiting wear of segmented seals, which explains why they only last for a few thousand hours which is quite inadequate for most applications.

SUMMARY OF THE INVENTION

The arrangement proposed in this description is characterized by an automatic reduction in the pressure at which seal segments are forced into contact with the friction part, and possibly elimination of this pressure. In its most general form, the sealing arrangement described in this description comprises a seal composed of butt jointed segments in the shape of an arc of a circle and a surrounding spring joining the segments together, the segments having a sealing face on the side opposite the spring and being laid out in contact with a part passing through an opening in a wall separating a high pressure containment from a low pressure containment; this arrangement is characterized in that the seal is put into position in front of the opening with high pressure applied to a first portion of one face opposite the sealing face and low pressure applied to a second portion of the face opposite the sealing face, and in that the sealing faces are shaped to form chambers surrounded by a thrust lip acting on the part, orifices passing through the segments from the chambers as far as the high pressure containment. As will be seen, the orifices (which may be calibrated to a given diameter, for example 1 millimeter) enable a pressure to be set up in the chambers to reduce the tightness of the segments. Preferably, the seal is made and laid out such that the forces due to the radial pressure, the spring, and due to friction on segments generate a minimum contact pressure between the segments and the friction part, or cancel out for a specific clearance between segments and the friction part, guaranteeing the required permeability to air. There is a clear distinction between this type of seal and seals such as those described in French patent 2 688 283 which move axially in front of an opening to produce two sealing states depending on the pressure difference and which are not segmented, and also seals described in French patent 2 613 019 in which a liquid is injected through the seal to separate the segments from the shaft. The latter seal requires a special high pressure supply circuit in order to inject the liquid and to retrieve it.

BRIEF DESCRIPTION OF THE DRAWINGS

One illustrative embodiment of the invention will now be described in more detail with reference to the following figures.

DETAILED DESCRIPTION OF THE PREFERRED EMBODIMENTS

Figure 1:
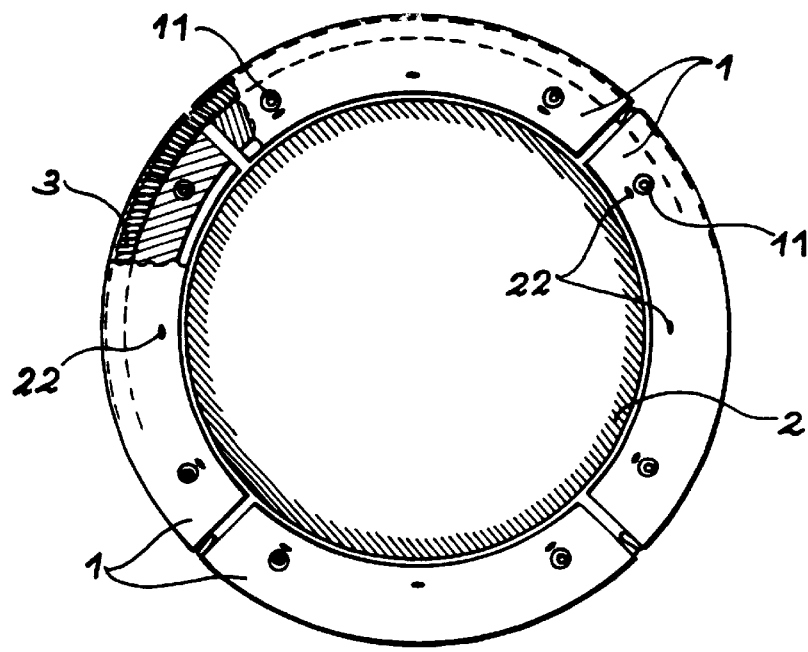
FIG. 1 is a general view of the seal.
Figure 2:
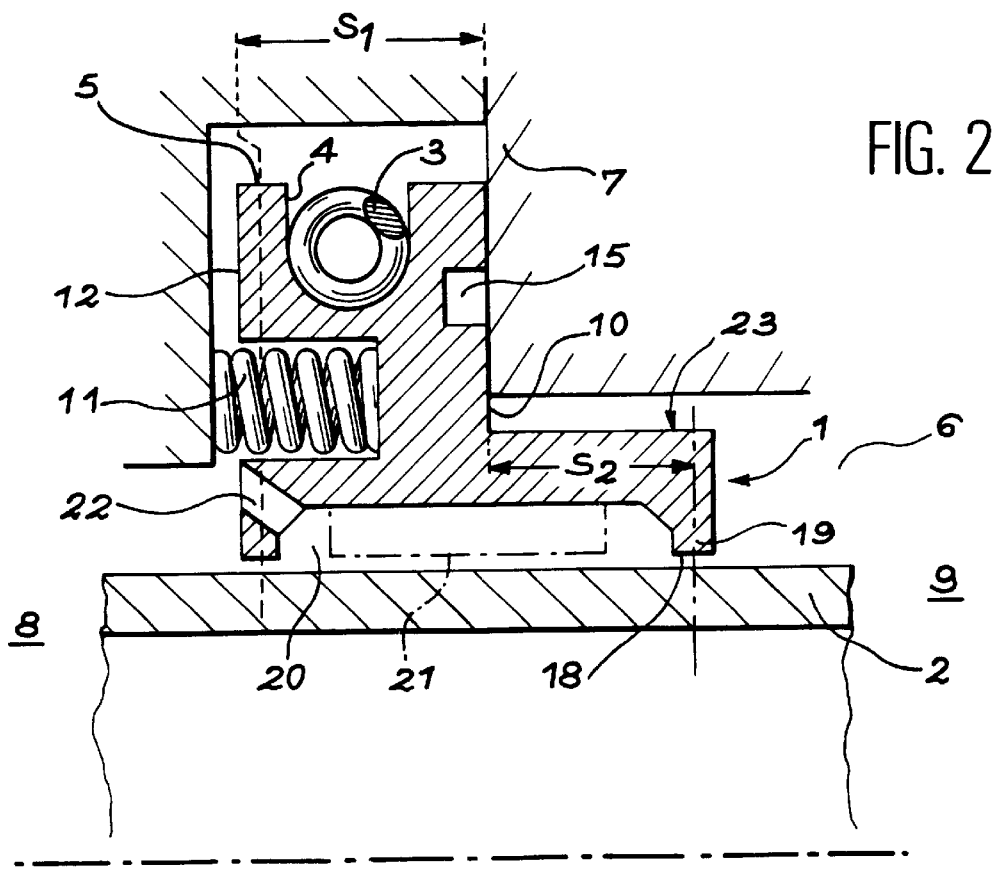
FIG. 2 is a sectional view of a segment of the seal.
Figure 4:
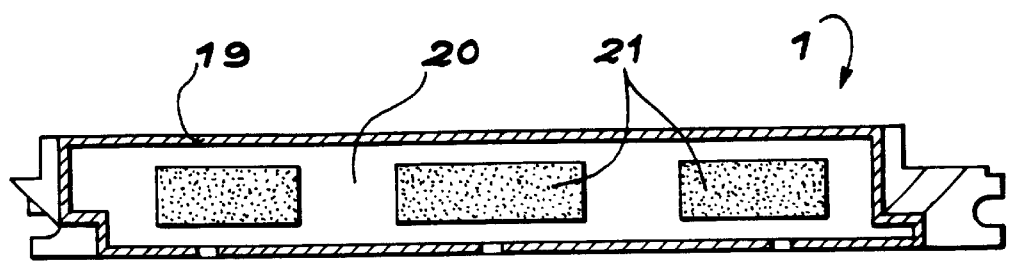
FIG. 4 is a view of the dynamic sealing face of a segment.
Figure 3:
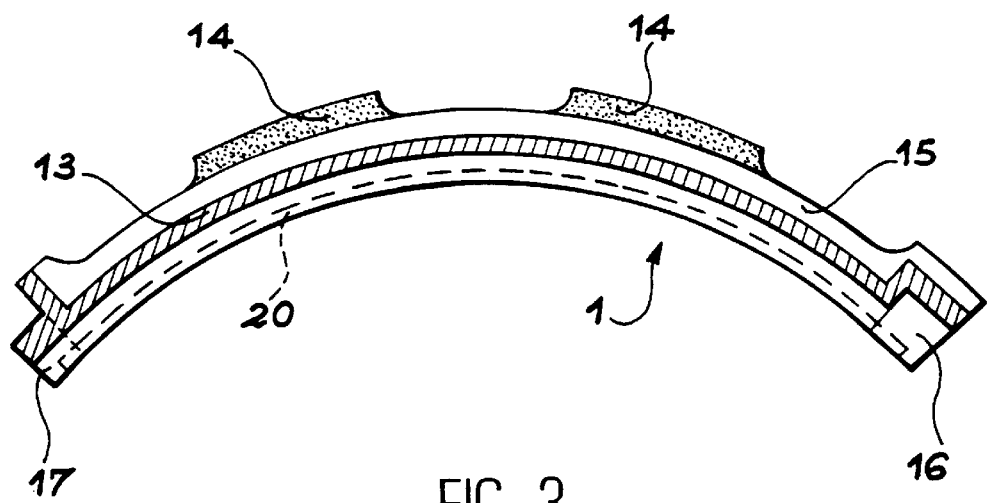
FIG. 3 is a cross-sectional view of the static sealing face of a segment.

Firstly, note with reference to FIG. 1 that a segmented seal is composed of a number of butt-jointed segments, four in this case, each extending around a quarter of the circumference, and pressed into contact with the surface of a shaft 2 by a surrounding spring 3 that surrounds them and holds them together. With reference to FIG. 2, it can be seen that the spring 3 is held in a groove 4 in the radially external face 5 of segments 1. Shaft 2 passes through an opening 6 in a stator 7 that delimits a first containment 8 and a second containment 9 between which the separation must be maintained despite the opening 6. Therefore, the seal provides a dynamic seal with shaft 2 since the shaft turns, and a static seal with the stator 7 with which the segments 1 are kept in contact through their rear face 10, which can be seen better in FIG. 3. Axial springs 11, compressed between the stator 7 and the forward face 12 of segments 1, maintain this static seal which is exerted by a lip 13 that is formed over part of the width of the rear face 10. Thrust pads 14, the purpose of which is to limit the contact pressure, are also pressed into contact with stator 7; they are separated from lip 13 by a discharge groove 15. FIG. 3 also shows that one of the ends of segments 1 forms a recess 16 into which the opposite end 17 of the adjacent segment 1 penetrates. This thus improves cohesion of the seal, and particularly provides total overlap of the opening 6 around the circumference.

Elements specific to the invention are located on the radially internal part of segments 1 close to shaft 2; the sealing face 18 of each segment 1 is shaped to present a peripheral lip 19 bearing on shaft 2, in which a chamber 20 extends corresponding to a recess in the surface 18; however, the chamber 20 is partially occupied by thrust pads 21 also designed to exert pressure on shaft 2 in order to reduce the contact pressure exerted on lip 19. Calibrated orifices 22 penetrate segments 1 from chamber 20 as far as the high pressure containment 8. Note that this portion radially on the inside of segments 1 comprises an extension 23 that extends in opening 6 on the side of the low pressure containment 9.

The invention described in this document is fitted in a turbo-machine, in which there are different pressures in the different internal volumes, due to pipes leading to different parts of the compressors, as is well known to an expert in the subject.

The purposes of the various pressures is to confine liquids in low pressure containments (particularly lubrication oil in bearing chambers; the seals are then used to complete the seal), to encourage air drafts towards some parts of the machine to be ventilated or to adjust deformations of flexible membranes.

When the machine is at rest, segments 1 are pressed into contact with shaft 2 by force Fr from the surrounding spring 3, since there is no pressure at that time; however, this is not serious because shaft 2 is not moving. When the machine is rotating, a pressure P1 is set up in the high pressure containment 8 and a lower pressure P2 is set up in the low pressure containment 9. These pressures exert centripetal forces P1.S1 and P2.S2, on segment 1 according to the notations in the figure, where S1 and S2 are the surface areas of the outside face on which the two pressures are applied (S2 being the surface area of the extension, mentioned above, of segment 1 in opening 6); furthermore, chamber 20 is filled at a pressure P3 which is slightly less than the pressure P1 due to pressure losses produced through the calibrated orifices 22, but is greater than pressure P2; this pressure exerts a force on segment 1 opposite to the previous forces, with an intensity approximately equal to P3. (S1+ S2). Therefore, the total force due to the pressure is equal to Fr+P1.S1+P2.S2−P3. (S1+S2). Since P3 is significantly closer to P1 than to P2, this total force is less than the force Fr exerted at rest, which means that the contact pressure of the seal on the shaft 2 is reduced. If the seal is judiciously designed, particularly with a sufficiently low spring force Fr, and if areas S1 and S2 are well chosen and if the pressures P1 and P2 are sufficiently different, this resulting force may even become negative, in other words segments 1 will separate from shaft 2 and in this case they will no longer be subject to wear; this situation is preferred. A balance then tends to be set up, since leaks occur from the high pressure containment 8 towards the low pressure containment 9 through chamber 20, and the pressure P3 reduces as the clearance between segment 1 and shaft 2 increases; it can theoretically reach an average pressure equal to (P1+P2)/2 if the clearance is sufficient, but the force exerted on segments 1 would then tend towards the value Fr+1/2(P1−P2) (S1− S2), which is normally positive since the areas S1 and S2 may be similar in many arrangements. Therefore, equilibrium is usually achieved with a value of P3 intermediate between its value if there is no clearance and the average of pressures P1 and P2; this value of the pressure is obtained with a slight clearance between segments 1 and shaft 2, which has the advantage of eliminating friction while reducing air leaks between one containment 8 and the other containment 9. The diameter of the calibrated orifices 22 may be about 1 millimeter to ensure satisfactory operation, the pressure P3 being just sufficient to separate segments 1.

What is claimed is:

1. A sealing apparatus comprising:
   a plurality of butt jointed segments positioned between a high pressure containment and a low pressure containment, the plurality of butt jointed segments each having a sealing face, a first face portion subject to a high pressure in the high pressure containment and a second face portion subject to a low pressure in the low pressure containment, the first and second face portions being positioned on an opposite side of the sealing face; and
   a surrounding spring configured to join the plurality of butt jointed segments together and urge the plurality of butt jointed segments to maintain a frictional contact with an element extending through the high pressure containment and the low pressure containment; and
   a thrust lip provided on the sealing face and configured to form a chamber with the element when the thrust lip is in contact with the element;
      wherein the plurality of butt jointed segments each has a plurality of orifices communicating the chamber and the high pressure containment and configured to produce pressure loss in the chamber such that the chamber has a lower pressure than the high pressure containment, and, wherein the plurality of orifices is calibrated to a diameter which does not allow the high pressure in the high pressure containment to fill the chamber.

2. The sealing apparatus according to claim 1, wherein the plurality of butt jointed segments is configured to permit a specific clearance element to allow permeability to air.

3. The sealing apparatus according to claim 1, wherein the sealing face comprises a plurality of thrust pads provided inside the thrust lip and configured to press against the element.

4. The sealing apparatus according to claim 1, wherein the plurality of butt jointed segments each has an arc shape and forms a circle around the element.

5. A sealing apparatus comprising:
   a plurality of segments positioned between a high pressure containment and a low pressure containment, said plurality of segments each having a sealing face, a first face portion subject to a high pressure in the high pressure containment and a second face portion subject to a low pressure in the low pressure containment, said first and second face portions being positioned on an opposite side of said sealing face;
   a spring configured to join said plurality of segments around a rotatable shaft extending through the high and low pressure containments and configured to urge said plurality of segments against the rotatable shaft; and
   a thrust lip provided on said sealing face and configured to form a chamber with the rotatable shaft when said thrust lip is in contact with the rotatable shaft;
      wherein said plurality of segments each has at least one orifice communicating the chamber and the high pressure containment and configured to produce pressure loss in the chamber such that the chamber has a lower pressure than the high pressure containment; and, wherein said at least one orifice is calibrated to a diameter which does not allow the high pressure in the high pressure containment to fill the chamber.

6. The sealing apparatus according to claim 5, wherein said plurality of segments is configured to permit a clearance for permeability to air.

7. The sealing apparatus according to claim 5, wherein said plurality of segments each comprises at least one thrust pad positioned inside the thrust lip and configured to press against the rotatable shaft.

8. The sealing apparatus according to claim 5, wherein said plurality of segments each has an arc shape and forms a circle around the rotatable shaft.

* * * * *